(12) United States Patent
Devanand et al.

(10) Patent No.: US 9,331,404 B2
(45) Date of Patent: May 3, 2016

(54) DIN RAIL LATCHING ARRANGEMENT

(71) Applicant: ASCO Power Technologies, L.P., Florham Park, NJ (US)

(72) Inventors: Gole Devanand, Maharashtra (IN); Patil Sandeep, Maharashtra (IN); Atul Dangat, Maharashtra (IN)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 13/945,953

(22) Filed: Jul. 19, 2013

(65) Prior Publication Data

US 2014/0199864 A1    Jul. 17, 2014

(30) Foreign Application Priority Data

Jan. 17, 2013 (IN) .......................... 160/MUM/2013

(51) Int. Cl.
*H01R 25/00* (2006.01)
*H01R 9/26* (2006.01)

(52) U.S. Cl.
CPC .................................. *H01R 9/2608* (2013.01)

(58) Field of Classification Search
USPC ......... 439/116, 532, 110, 111, 115, 121, 122, 439/716; 361/679.01, 679.02, 679.39, 361/679.4
See application file for complete search history.

(56) References Cited

U.S. PATENT DOCUMENTS

| | | | |
|---|---|---|---|
| 5,904,592 A * | 5/1999 | Baran et al. | 439/532 |
| 6,292,076 B1 * | 9/2001 | DeGrazia et al. | 335/202 |
| 6,563,697 B1 * | 5/2003 | Simbeck et al. | 361/668 |
| 7,488,913 B1 * | 2/2009 | Durham et al. | 200/400 |
| 7,674,129 B1 * | 3/2010 | Liu | 439/532 |
| 8,226,433 B1 * | 7/2012 | Correll et al. | 439/532 |
| 2006/0175489 A1 * | 8/2006 | Portal | 248/215 |
| 2008/0108248 A1 * | 5/2008 | Lim et al. | 439/532 |
| 2008/0146055 A1 * | 6/2008 | Eckardt | 439/110 |

* cited by examiner

*Primary Examiner* — Abdullah Riyami
*Assistant Examiner* — Harshad Patel
(74) *Attorney, Agent, or Firm* — McDonnell Boehnen Hulbert & Berghoff LLP

(57) ABSTRACT

A latching arrangement for detachably mounting a device on a DIN rail. A support member configured to be mounted on the DIN rail. A guiding slot configured on a same side of the device on which the support member is configured. An engaging lug received in the guiding slot and adapted to move between an engaging, extended configuration and a retracted, disengaging configuration. An urging element cooperating with the engaging lug and the device, the urging element adapted to be configured between a first operative configuration in which the urging element urges the engagement lug towards the support member and a second operative configuration in which said urging element is moved to facilitate moving of the engaging lug away from said support member.

8 Claims, 19 Drawing Sheets

DIN RAIL LATCHING ARRANGEMENT

FIELD OF THE DISCLOSURE

The present disclosure relates to a latching arrangement. More particularly, the present disclosure relates to a latching arrangement secured to electrical/electronical/electronic devices for detachably mounting the electrical/electronical/electronic devices onto a DIN rail.

DEFINITIONS

DIN rail is a metal rail widely used for mounting electrical/electronical/electronic devices such as circuit breakers and industrial control equipment, more particularly, DIN (Deutsches Institut far Normung) rail is an elongated conductive channel shaped member having side edge flange portions there-along to which connector engagement is made.

BACKGROUND

A large number of electrical/electronic/electronic devices/terminal blocks such as circuit breakers and industrial control equipment may be detachably mounted on a DIN rail. Most of the electrical/electronic devices are provided with a variety of latching arrangements for facilitating detachably mounting of the electrical/electronic devices onto the DIN rail. Specifically, most of such electrical/electronic devices are provided with two guide ways and two substantially planer steady tabs for facilitating mounting of the electrical/electronic devices onto the DIN rail. The concept of detachably mounting the DIN rail makes possible a compact, organized arrangement of terminal blocks and other DIN rail mount components. Such an arrangement of mounting of the electrical/electronic devices onto the DIN rail not only gives the appearance of quality, but also saves time and space, enhances design capabilities and provides a centralized connect-disconnect area. At the same time, the DIN concept allows designers to take advantage of constant advances in terminal block technology. More particularly, the DIN rail components do more than terminating wires. However, detachably mounting of the electrical/electronic devices onto the DIN rail is complicated. Various connectors and latching arrangements are known in the prior art for detachably mounting the DIN rail terminal blocks/electrical/electronic devices onto the DIN rail. Such latching arrangements may either be secured to the DIN rail or may be associated with the electrical/electronic devices to be mounted on the DIN rail.

However, most of the connectors and latching arrangements for detachably securing the DIN rail terminal blocks/electrical/electronic devices onto the DIN rail that are known in the prior art are expensive and fails to prevent unintended disengagement of the terminal blocks/electrical/electronic devices from the DIN rail.

Accordingly, there is a need for a latching arrangement that assuredly mounts the DIN rail terminal blocks/electrical/electronic devices onto the DIN rail, while permitting intentional removal of the DIN rail terminal blocks/connector from the DIN rail. Further, there is a need for a latching arrangement that prevents unintended disengagement of the DIN rail terminal blocks/connector from the DIN rail. Still further, there is a need for a latching arrangement for detachably mounting the electrical/electronic devices onto the DIN rail that is simple and convenient to use. Further, there is a need for a latching arrangement that involves fewer number of moving parts and accordingly is less prone to failures and requires less maintenance.

OBJECTS

Some of the objects of the present disclosure which at-least one embodiment is able to satisfy, are described herein below:

It is an object of the present disclosure to ameliorate one or more problems of the prior art or to at least provide a useful alternative.

An object of the present disclosure is to provide a reliable connection between electrical/electronic devices/DIN rail terminal blocks and a DIN rail.

Still another object of the present disclosure is to provide a latching arrangement configured on the electrical/electronic devices/DIN rail terminal blocks that facilitates secure mounting of the electrical/electronic devices/DIN rail terminal blocks/connector to the DIN rail, while permitting intentional removal of the DIN rail terminal blocks/connector from the DIN rail.

Yet another object of the present disclosure is to provide a latching arrangement that prevents unintentional disengagement of the electrical/electronic devices/DIN rail terminal blocks/connector from the DIN rail.

Still another object of the present disclosure is to provide a latching arrangement that is simple in construction.

Another object of the present invention is to provide a latching arrangement that requires lesser efforts for engaging and disengaging the electrical/electronic devices/DIN rail terminal blocks/connector from the DIN rail.

Still another object of the present disclosure is to provide a latching arrangement that is easy to manufacture.

Another object of the present disclosure is to provide a latching arrangement that involves fewer number of moving parts and accordingly is less prone to failures and requires less maintenance.

Yet another object of the present invention is to provide a latching arrangement that facilitates quick and easy engagement and disengagement of the electrical/electronic devices/DIN rail terminal blocks from the DIN rail.

Another object of the present invention is to provide a latching arrangement for securely mounting the electrical/electronic devices/DIN rail terminal blocks onto the DIN rail that is inexpensive.

Another object of the present invention is to provide a latching arrangement for mounting the DIN rail terminal blocks onto the DIN rail, wherein said elements of the latching arrangement are sturdy and thereof exhibit enhanced service life.

Still another object of the present invention is to provide a latching arrangement that can be used for all control room equipment and in applications where vibration requirements are stringent.

These and other objects of the present disclosure are dealt in great extent by the accompanying drawings and the descriptive matter, in which there are illustrated exemplary embodiments of the disclosure.

SUMMARY

In accordance with one embodiment of the present invention, there is provided a latching arrangement for detachably mounting a device on a DIN rail. The latching arrangement includes a support member, a guiding slot, an engaging lug and an urging element. The support member is configured on either of the sides of the device to be mounted on the DIN rail. The support member receives the DIN rail to facilitate aligning of the device with respect to the DIN rail. The guiding slot is configured on the same side of the device on which the support member is configured and is spaced away from the support member. The engaging lug is received in the guiding slot and moves between an engaging, extended configuration in which the engaging lug moves towards the support member and engages with a lip portion of the DIN rail received by the support member and a retracted, disengaging configuration in which the engaging lug is pulled away from the support member to disengage from the lip portion of the DIN rail received by the support member. The urging element cooperates with the engaging lug and the device. The urging element is configured between a first operative configuration in which the urging element urges the engagement lug towards the support member for facilitating engagement of the engagement lug with the lip portion of the DIN rail and a second operative configuration in which the urging element is moved to facilitate moving of the engaging lug away from the support member for causing disengagement of the engagement lug from the lip portion of the DIN rail.

Typically, the urging element is a spring element that is configured between a normal, non-compressed configuration in which the spring urges the engagement lug towards the support member and a compressed configuration in which the spring facilitates moving of the engaging lug away from the support member for causing disengagement of the engagement lug from the lip portion of the DIN rail.

Preferably, the urging element is a compression spring.

Generally, the urging element is a helical compression spring.

Alternatively, the urging element is a leaf spring.

Alternatively, the urging element is an extension spring.

Typically, urging element is integrally formed with said engaging lug.

In accordance with an embodiment, the urging element utilizes a cam and follower arrangement and is connectable to a lever member to facilitate rotation of the cam of the cam and follower arrangement for actuating the urging element.

Specifically, the engaging lug is provided with a handle to facilitate pulling of the engaging lug away from the support member to disengage the engaging lug from the lip portion of the DIN rail received over the support member.

BRIEF DESCRIPTION

The disclosure will now be explained in relation to the accompanying drawings, in which:

FIG. 1b illustrates an isometric view of an electrical/electronic device depicting the front face of the electrical/electronic device that is to be detachably mounted on the DIN rail of FIG. 1a;

FIG. 1e illustrates an assembled view depicting the electrical/electronic device of FIG. 1b mounted on the DIN rail of FIG. 1a;

FIG. 5b illustrates an enlarged view of the integrated engaging lug—urging element combination of the latching arrangement of FIG. 5a;

FIG. 7b illustrates an enlarged view of the engaging lug of the latching arrangement illustrated in FIG. 7a;

FIG. 8c illustrates operation of the lever for facilitating rotation of a cam of the cam follower arrangement of FIG. 8a; and FIG. 8d illustrates operation of the lever for facilitating rotation of a cam in rear isometric view of the cam follower arrangement of FIG. 8a.

DETAILED DESCRIPTION

The disclosure will now be described with reference to the accompanying drawings which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure envisages a latching arrangement used for detachably mounting electrical/electronical/electronic devices such as circuit breakers and industrial control equipment onto a DIN rail. The latching arrangement provides a reliable connection between electrical/electronic devices/DIN rail terminal blocks and a DIN rail. The latching arrangement facilitates secure mounting of the electrical/electronic devices/DIN rail terminal blocks/connector to the DIN rail, while permitting intentional removal of the DIN rail terminal blocks/connector from the DIN rail. Further, the latching arrangement prevents unintentional disengagement of the electrical/electronic devices/DIN rail terminal blocks/connector from the DIN rail.

Figure 1A:
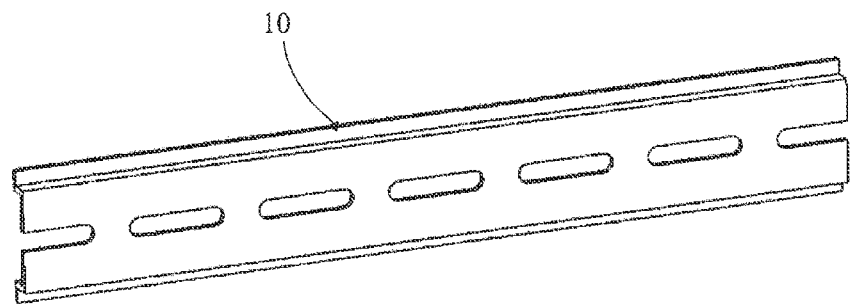
FIG. 1a illustrates a DIN rail upon which at least one electrical/electronic device is to be detachably mounted.

FIG. 1a of the accompanying drawings illustrates a DIN rail 10 upon which at least one electrical/electronic/electronic device/Din rail terminal block 20 is to be detachably mounted. The DIN rail 10 is a metal rail of a standard type widely used for mounting circuit breakers and industrial control equipment inside equipment racks. The DIN rail 10 is typically made from cold rolled carbon steel sheet with a zinc-plated and chromated bright surface finish. The DIN rail adaptor is normally connected to the bottom of the interrupter's base.

The DIN rails 10 are used in the system equipment and utilizes a variety of latching arrangements 30, wherein the latching arrangement 30 facilitate detachably securing the various electronic devices 20 to the DIN rail 10. The body of the movable electronic device 20 can be easily fixed to the DIN rail 10 with the help of the latching arrangements 30. The electronic device 20 may include electrical/electronical and electronic equipment, meters, switchgear products etc.

Figure 1B:
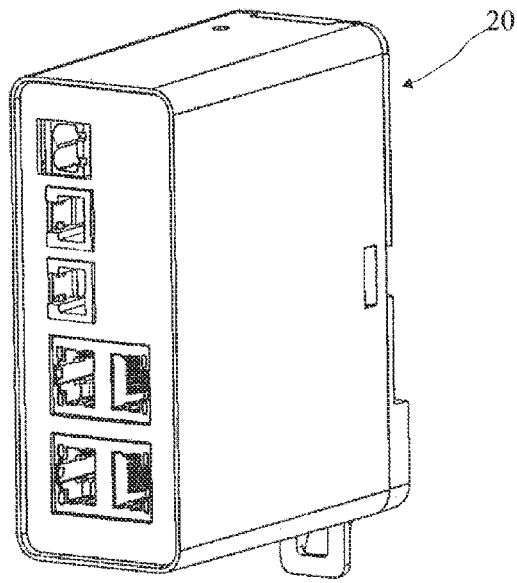
Figure 1C:
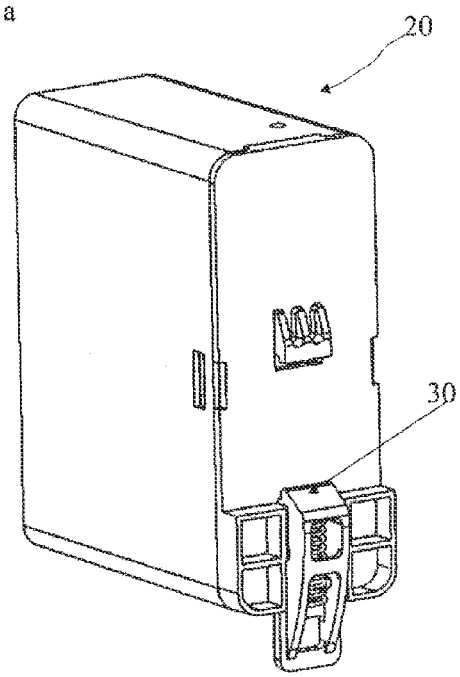
FIG. 1c illustrates an isometric view depicting the rear face of the electrical/electronic device of FIG. 1b.
Figure 1D:
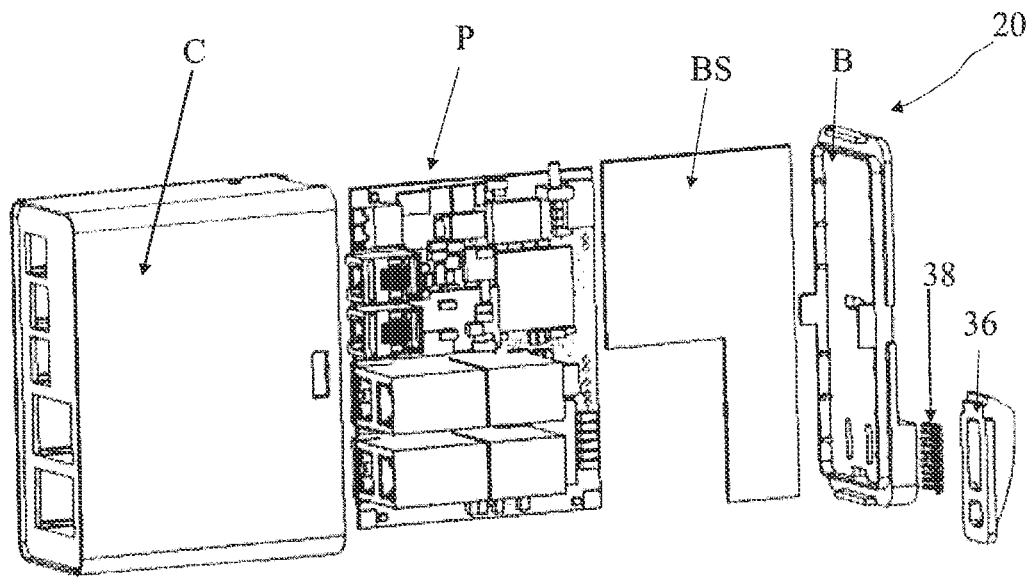
FIG. 1d illustrates an exploded view of the electrical/electronic device of FIG. 1b, wherein the electrical/electronic device generally includes an electronic PCB, a support plate, a cover, a base, a spring and a DIN clip or an engaging lug.
Figure 1E:
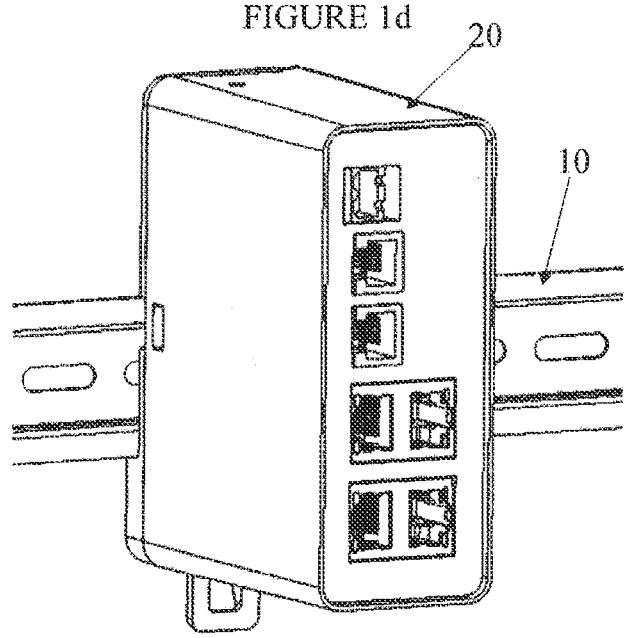

Most of the electrical/electronic devices/Din rail terminal blocks 20 to be removable mounted on the DIN rail 10 are configured to facilitate removable mounting thereof over the Din rail 10, specifically, the electrical/electronic devices/Din rail terminal blocks 20 are having two guide ways and two substantially planer steady tabs for facilitating removable mounting thereof over the Din rail 10. FIG. 1b illustrates an isometric view of the electrical/electronic device 20 depicting the front face of the electrical/electronic device 20 that is to be detachably mounted on the DIN rail 10. FIG. 1b illustrates the front face of the electrical/electronic device 20. FIG. 1c illustrates an isometric view depicting the rear face of the electrical/electronic device 20 on which the latching arrangement 30 for detachably mounting the electrical/electronic device 20 on the DIN rail 10 is secured. FIG. 1d illustrates an exploded view of the electrical/electronic device 20. The electrical/electronic device 20 generally includes a cover "C", a PCB "P", a board support "BS" and a base "B". FIG. 1e illustrates an assembled view depicting the electrical/electronic device 20 mounted on the DIN rail 10.

Figure 2A:
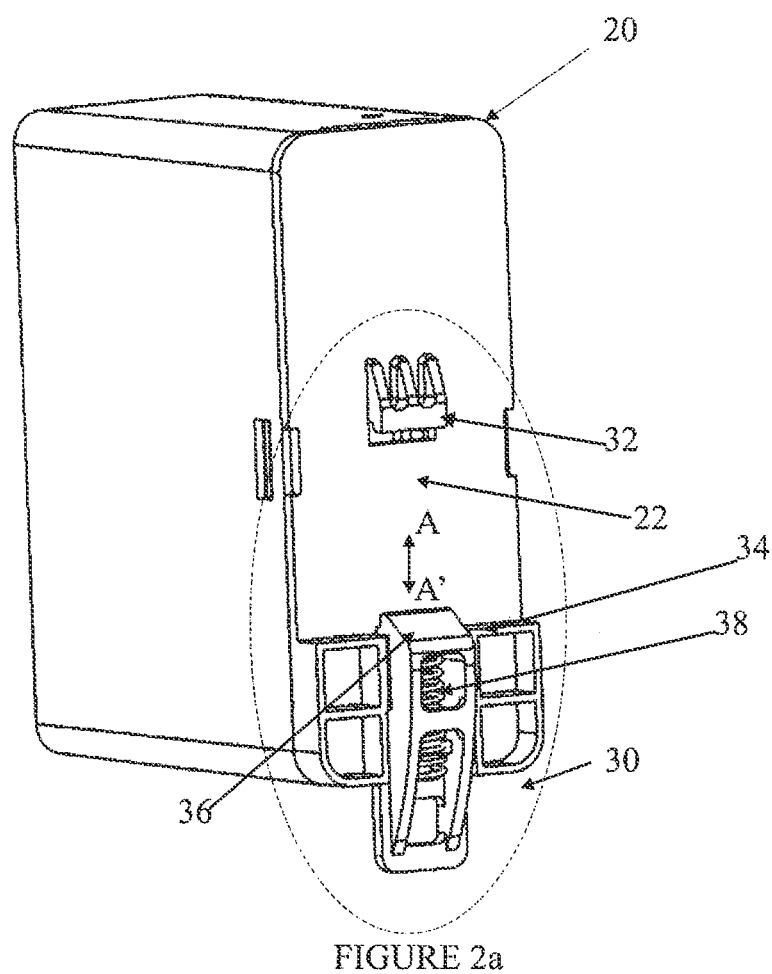
FIG. 2a illustrates a schematic representation of the electrical/electronic device of FIG. 1b-FIG. 1c with a latching arrangement secured to the rear face of the electrical/electronic device for mounting the electrical/electronic device on the DIN rail (not illustrated in FIG. 2a) of FIG. 1a, wherein the latching arrangement has an urging element in form of a helical compression spring.

FIG. 2a illustrates a rear face of an electrical/electronic device 20 with a latching arrangement 30 in accordance with one embodiment of the present disclosure mounted thereon. The latching arrangement 30 is secured to the electrical/electronic device 20 and is used for mounting the electrical/electronic device 20 onto the DIN rail 10 (Not illustrated in FIG. 2a). The latching arrangement 30 used for detachably mounting the electrical/electronic/electronic device 20 on the DIN rail 10 includes a support member 32, a guiding slot 34, an engaging lug 36 and an urging element 38. The latching arrangement 30 clamps the DIN rail 10 and is so configured that it can be used together with the different types and configuration of removable electronic devices 20. The engaging lug 36 of the latching arrangement 30 moves along A-A' direction as illustrated in FIG. 2a to cause gripping of the DIN rail 10 (not illustrated) between the support member 32 and the engaging lug 36. The latching arrangement 30 including the support member 32 may be disposed near either ends of the device 20 to be mounted on the DIN rail 10, particularly, the latching arrangement 30 may be disposed either near operative top end of the device 20 or near the operative bottom end of the device 20. As illustrated in FIG. 2a, the support member 32 is configured on a rear face of the electrical/electronic device 20 and receives the DIN rail 10 operatively underneath thereof, thereby facilitating aligning of device 20 with respect to the DIN rail 10 for mounting of the device 20 over the DIN rail 10.

The guiding slot 34 is configured on the same side of the device 20 on which the support member 32 is configured on and is spaced away from the support member 32 to define a space 22 between the guiding slot 34 and support member 32 for receiving the DIN rail 10. The engaging lug 36 is received in the guiding slot 34 and moves between an engaging, extended configuration in which the engaging lug 36 moves towards the support member 32 and engages with a lip portion of the DIN rail 10 received by the support member 32 and a retracted, disengaging configuration in which the engaging lug 36 is pulled away from the support member 32 to disengage from the lip portion of the DIN rail 10 received by the support member 32 to facilitate disengagement and removal of the device 20 from the DIN rail 10.

The urging element 38 cooperates with the engaging lug 36 and the electrical/electronic/electronic device 20, and takes up a first configuration in which the urging element 38 urges the engagement lug 36 towards the support member 32 for facilitating engagement of the engagement lug 36 with the lip portion of the DIN rail 10 and a second configuration when the engaging lug 36 is pulled away from the support member 32 for facilitating disengagement of the engagement lug 36 from the lip portion of the DIN rail 10.

Referring to FIG. 2a, the urging element 38 is a spring element 38, wherein the spring element 38 urges the engagement lug 36 towards the support member 32 in a normal, non-compressed state thereof and gets compressed when the engaging lug 36 is pulled to the retracted, disengaging configuration of the engaging lug 36. In accordance with another embodiment, the spring element 38 is a helical compression spring. The latching arrangement 30 in accordance with the present embodiment is simple in construction and easy to use. Further, such latching arrangement 30 involves minimum number of the moving components, thereby reducing the overall material cost and maintenance cost due to prevented breakdowns.

Figure 2B:
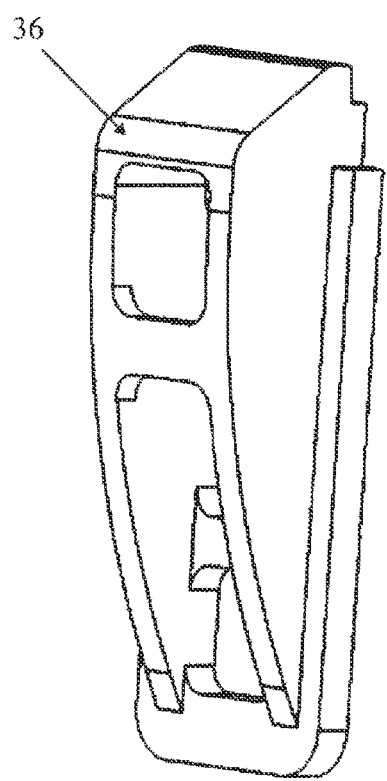
FIG. 2b and FIG. 2c illustrates a schematic representation of an engagement lug (without the spring) of the latching arrangement of FIG. 2a, wherein the engagement lug includes features such as spring rest and spring support for facilitating retaining of the spring therein.
Figure 2C:
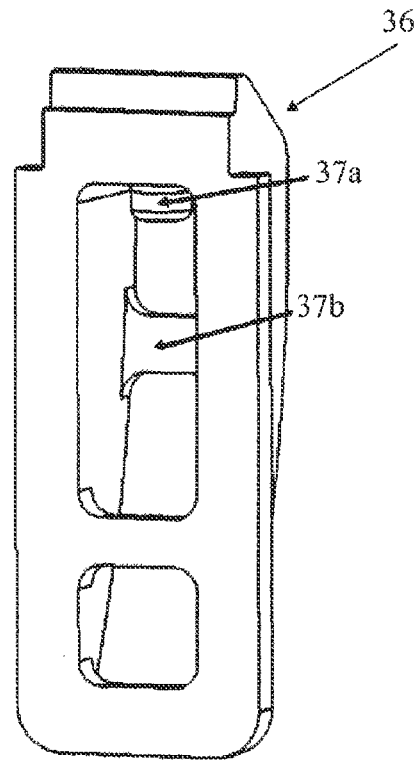

FIG. 2b and FIG. 2c illustrates a schematic representation depicting an enlarged view of an engagement lug 36 (without the spring) of the latching arrangement 30, wherein the engagement lug 36 includes features such as spring rest 37a and spring support 37b for facilitating retaining of the spring therein.

Figure 3A:
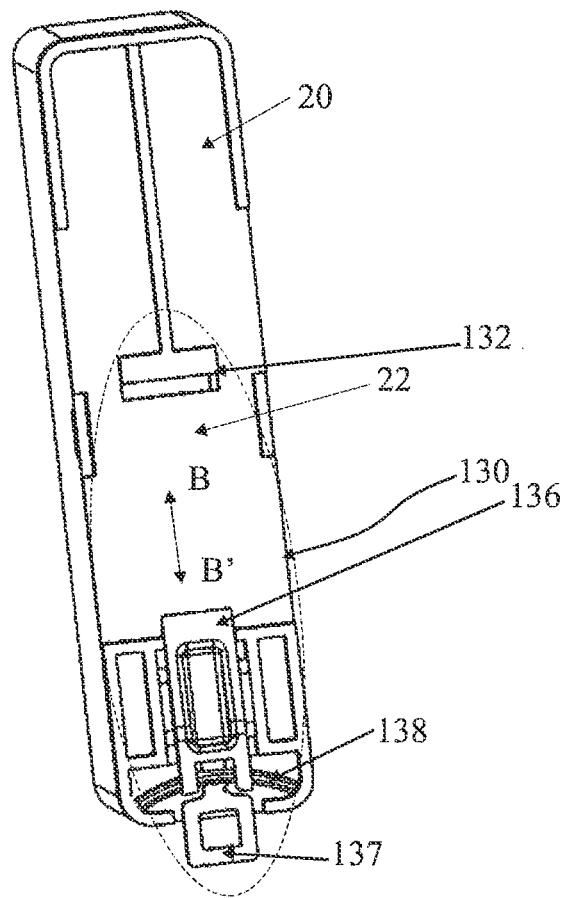
FIG. 3a illustrates a schematic representation of a latching arrangement with urging element in form of a leaf spring in accordance with another embodiment of the present disclosure.

In accordance with another embodiment, a latching arrangement 130 utilizes a leaf spring 138 as the urging element as is illustrated in FIG. 3a of the accompanying drawings. As illustrated in FIG. 3a, the engaging lug 136 is actuated by a handle 137 to facilitate pulling of the engaging lug 136 away from the support member 132 in the direction B-B' as illustrated in FIG. 3a to cause compression of the leaf spring 138 and thereby resulting in disengagement of the engaging lug 136 from the lip portion of the DIN rail 10 received under the support member 132. As the pulling force is released the leaf spring 138 takes up original configuration thereof to cause engagement of the engaging lug 136 with the lip portion of the DIN rail 10 received under the support member 132. Such a configuration of the latching arrangement 130 makes the assembly of the components simpler. In accordance with this embodiment, the leaf spring 138 is fitted on to the rear face of the electrical/electronic/electronic device 20 and is actuated by moving the handle 137 in B-B' direction as illustrated in FIG. 3a. The electrical/electronical or electronic device 20 can be clamped on the DIN rail 10 by pulling the engaging lug 136 in the operative downward direction, placing the device 20 in alignment with the DIN rail 10, such that the DIN rail 10 is received between the support member 132 and the engaging lug 136 of the latching arrangement 130 and thereafter releasing the engaging lug 136 to engage with the lip portion of the DIN rail 10 and facilitate gripping of the DIN rail 10 between the engaging lug 136 and the support member 132.

Figure 3B:
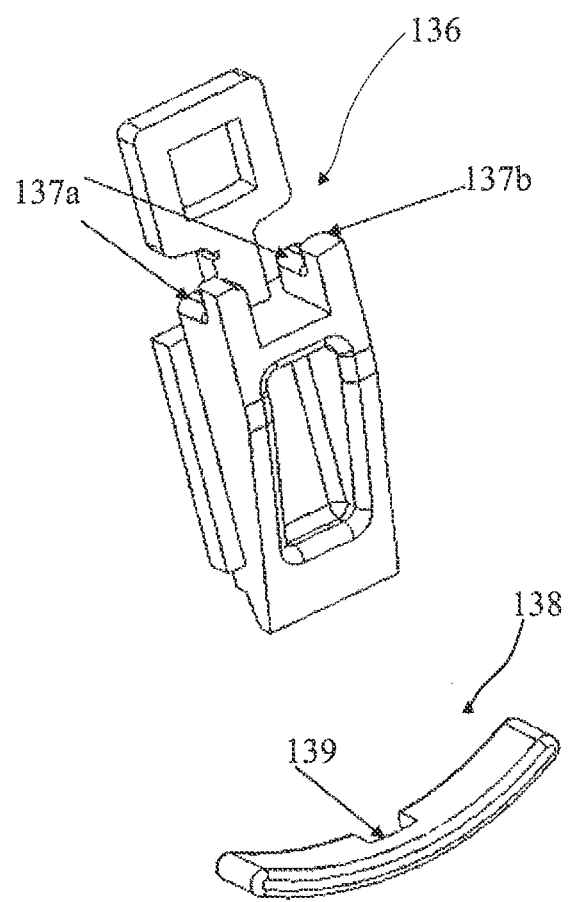
FIG. 3b illustrates a schematic representation of the engagement lug actuated by the leaf spring and illustrated separated from the leaf spring, wherein the engagement lug includes features such as leaf spring rest and leaf spring support for facilitating retaining of the leaf spring therein.

FIG. 3b and FIG. 3c illustrates a schematic representation of the engagement lug 136 actuated by the leaf spring 138 of the latching arrangement 130, wherein the engagement lug 136 includes features such as leaf spring rest 137a and leaf spring support 137b and the leaf spring 138 has a slot 139 for facilitating assembly of the leaf spring 138 to the engagement lug 136 for facilitating retaining of the leaf spring 138 in the engagement lug 136. Such a configuration of the latching arrangement of FIG. 3a facilitates supporting, guiding and resting of the leaf spring 138 in the engagement lug 136 for ensuring smooth operation of the latching arrangement 130. Such a configuration of the latching arrangement of FIG. 3a enables proper working of the leaf spring 138.

Figure 4A:
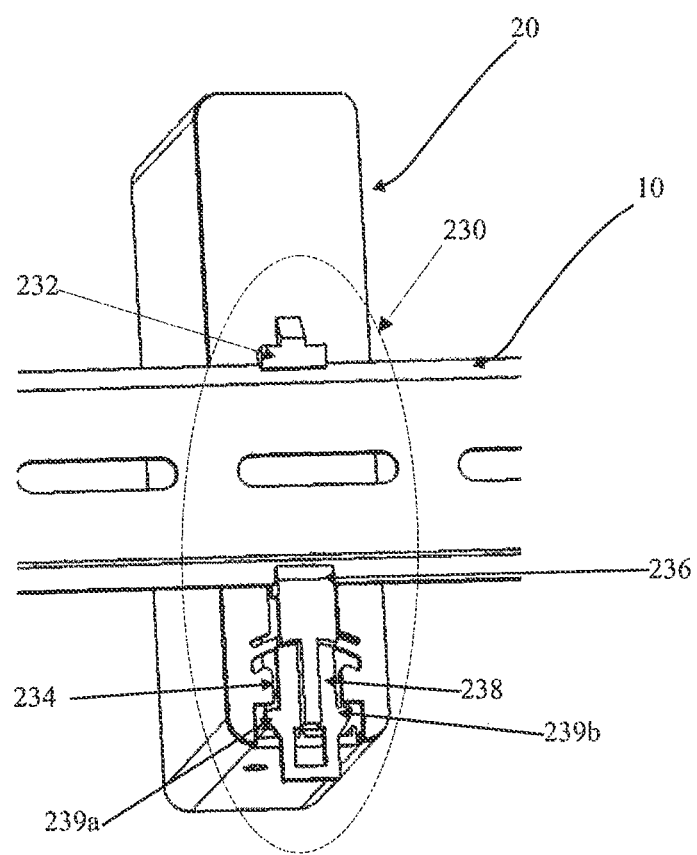
FIG. 4a illustrates a latching arrangement used for mounting a device on a DIN rail in accordance with another embodiment of the present disclosure, wherein an urging element of the latching arrangement is integrally formed with an engaging lug of the latching arrangement.
Figure 4B:
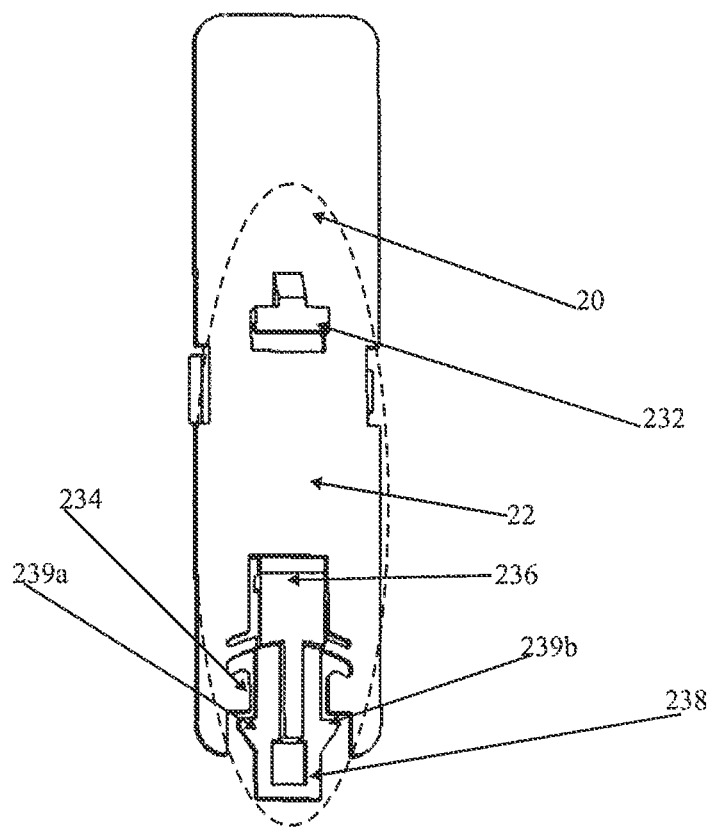
FIG. 4b illustrates an enlarged view of the integrated engaging lug—urging element combination of the latching arrangement of FIG. 4a mounted on the rear face of the device to be mounted onto the DIN rail.

In accordance with another embodiment, a latching arrangement 230 utilizes an urging element 238 that is integrally formed with the engaging lug 236 as is illustrated in FIG. 4a and FIG. 4b. FIG. 4a and FIG. 4b illustrates a support member 232, a guiding slot 234, and a latching arrangement 230 with an urging element 238 thereof integrally formed with an engaging lug 236 thereof in accordance with an embodiment of the present disclosure. The engaging lug 236 is fitted to the rear face of the electrical/electronic device 20. In this case, the flexible lugs 239a and 239b of the urging element 238 are pressed horizontally inwards and the engaging element is pulled in operatively downward direction, such an action causes the engaging lug 236 to slide downwardly through a typical profile configured on the rear face of the electrical/electronic device 20. At this stage, the electrical/electronic device 20 is fitted on the DIN rail by forcing the engaging lug 236 in the operative upward direction. Such a configuration of the latching arrangement 230 does not require leaf spring or helical compression spring, hence assembly becomes much simpler.

Figure 5A:
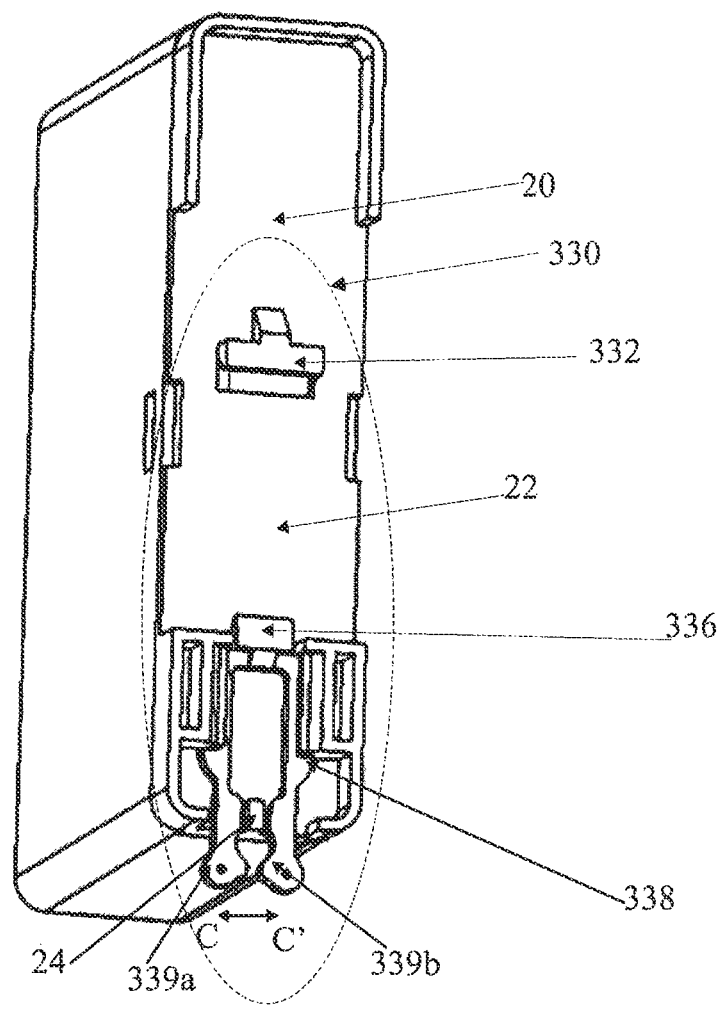
FIG. 5a illustrates a latching arrangement in accordance with another embodiment, wherein an urging element of the latching arrangement is integrally formed with an engaging lug of the latching arrangement.
Figure 5B:
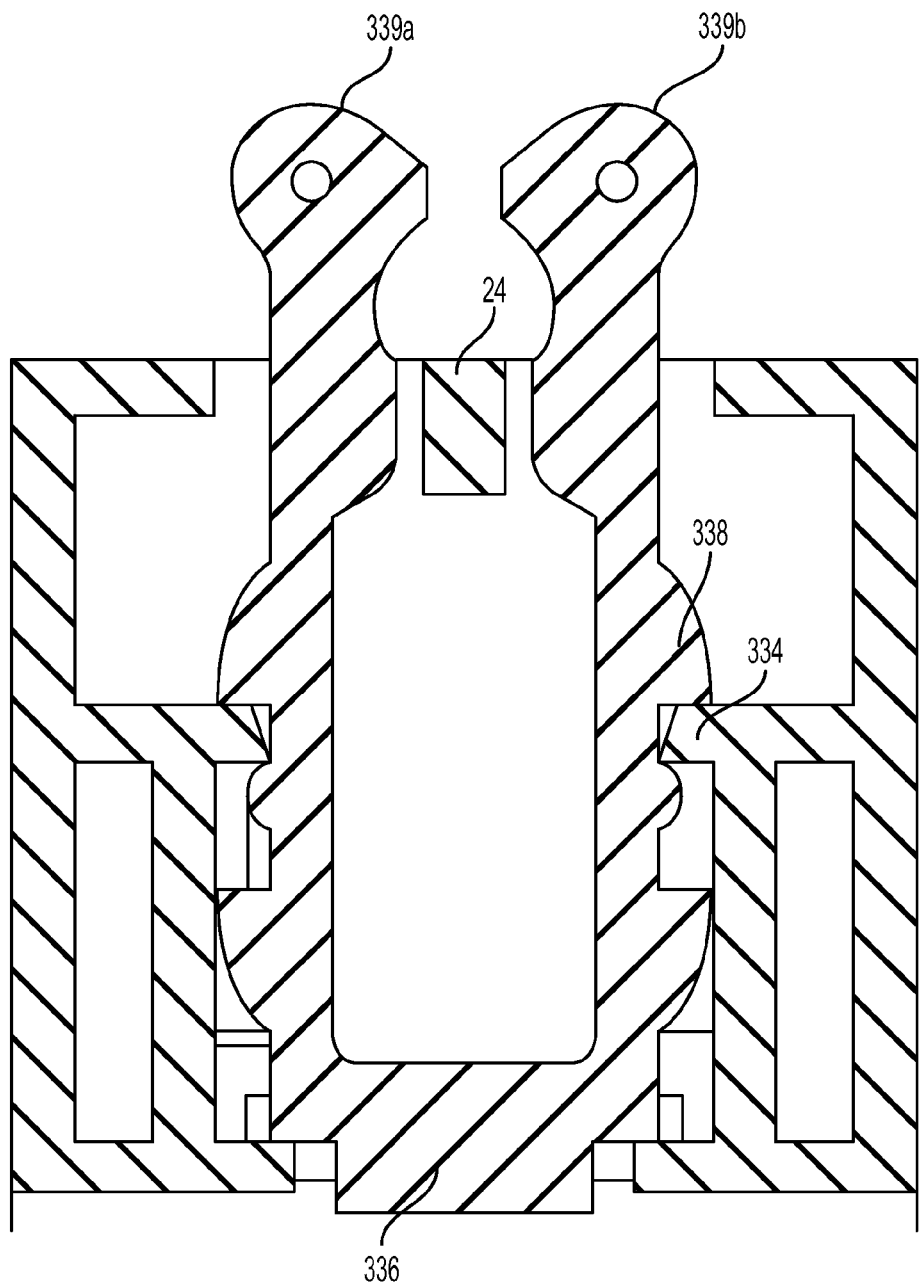

In accordance with still another embodiment, a latching arrangement 330 utilizes an urging element 338 that is integrally formed with said engaging lug 336. For example FIG. 5a and FIG. 5b illustrates a support member 332 and a latching arrangement 330 with an urging element 338 thereof integrally formed with an engaging lug 336 thereof in accordance with an embodiment of the present disclosure. The engaging lug 336 is fitted to the rear face of the electrical/electronic/electronic device 20. In this case, the flexible arms 339a and 339b of the urging element 338 are pressed horizontally inwards along the direction C-C' as illustrated in FIG. 5a, such an action causes the engaging lug 336 to slide in upwardly and downwardly direction through a typical profile configured on the rear face of the electrical/electronic device 20. As the engaging lug 336 slides in operatively downward direction, the electrical/electronic device 20 is fitted on the DIN rail by forcing the engaging lug 336 in the operative upward direction. Such a configuration of the latching arrangement 330 also does not require leaf spring or helical compression spring, hence assembly becomes much simpler.

Figure 6A:
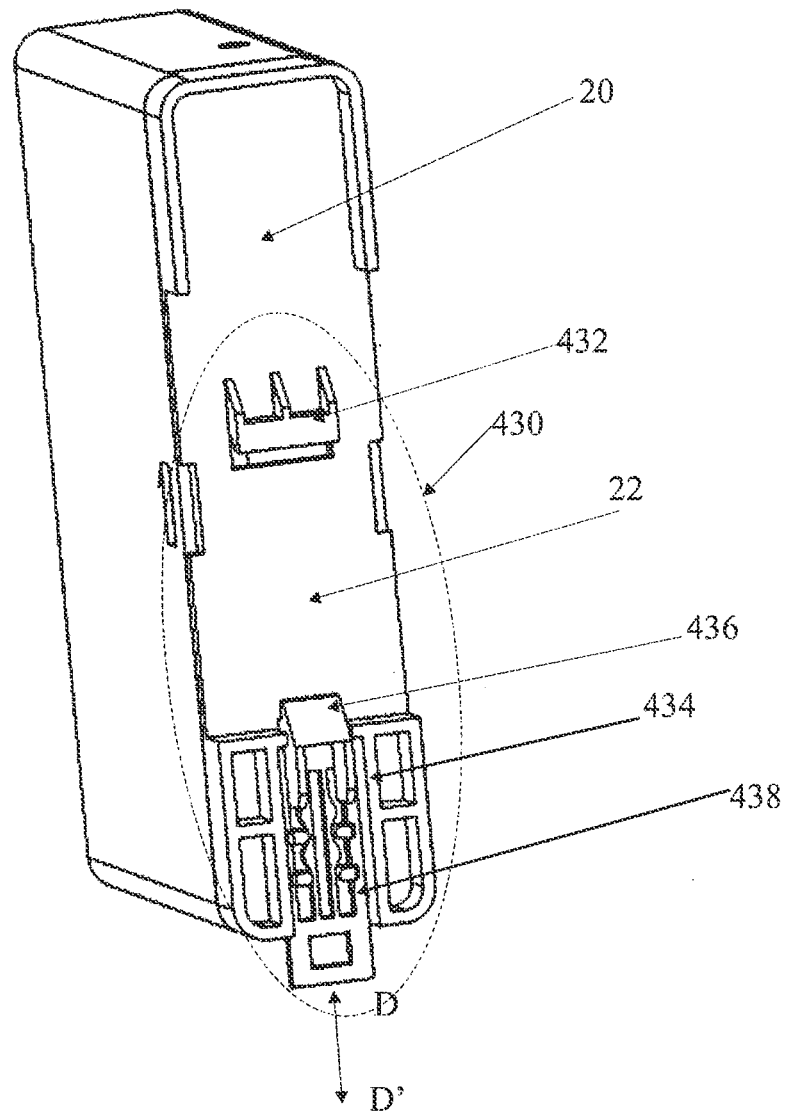
FIG. 6a illustrates an isometric view of an electrical/electronic device with a latching arrangement used for detachably mounting the electrical/electronic device on the DIN rail mounted on the rear face of the device in accordance with another embodiment, wherein an engaging lug of the latching arrangement has urging element integrally formed therein.
Figure 6B:
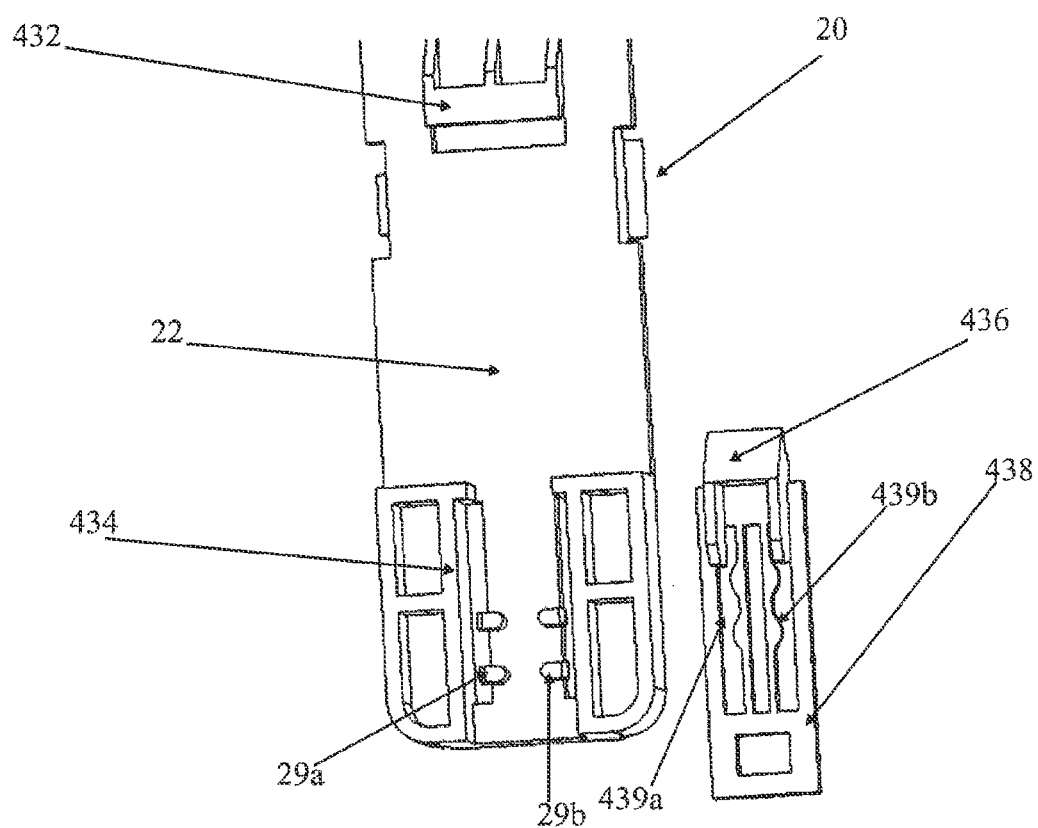
FIG. 6b illustrates an enlarged view of the latching arrangement of FIG. 6a disassembled from the rear face of the device that is to be mounted on the DIN rail.

FIG. 6a illustrates an isometric view of an electrical/electronic device 20 with a latching arrangement 430 used for detachably mounting the electrical/electronic device 20 on the DIN rail 10 in accordance with another embodiment, wherein an engaging lug 436 of the latching arrangement 430 has urging element 438 integrally formed therein. FIG. 6b illustrates disassembled view in which the engaging lug-urging element combination of the latching arrangement 430 is disassembled from the rear face of the device 20 that is to be mounted on the DIN rail 10.

Figure 6C:
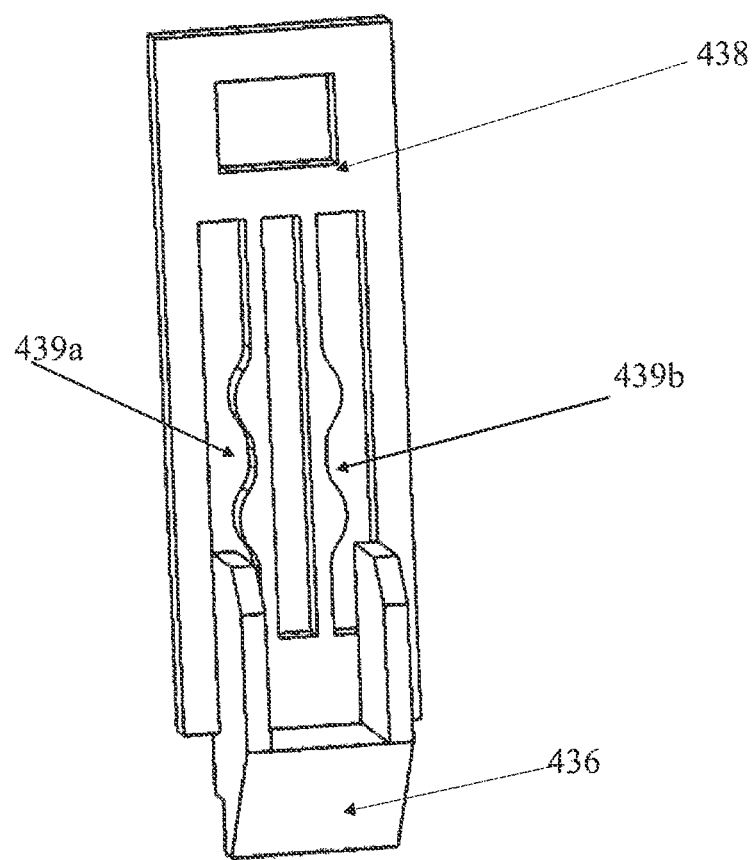
FIG. 6c illustrates an enlarged view of the engaging lug of FIG. 6b with the urging element integrally formed therein.

FIG. 6c illustrates an enlarged view of the engaging lug 436 of the latching arrangement 430, wherein the engaging lug 436 includes an urging element 438 integrally formed therewith. The urging element 438 includes a plurality of flexible portions 439a and 439b and the guiding slot 434 formed on the rear face of the device 20 includes a plurality of flexible projections 29a and 29b configured thereon. By pulling the urging element 438 integrated engaging lug 436 in the operatively downward direction D-D' as illustrated in FIG. 6a, the engaging lug 436 can be moved away from the support member, the flexible portion of the urging element 438 acts as a spring and facilitates return of the urging element 438 integrated engaging lug 436 to move closer to the support member 432, when the pulling force is removed and cause engagement of the engaging lug 436 with the lip portion of the DIN rail 10. After fitting the electrical/electronic device 20 on the DIN rail 10 and releasing the engaging lug 436, the device 20 gets clamped on the DIN rail 10.

Figure 7A:
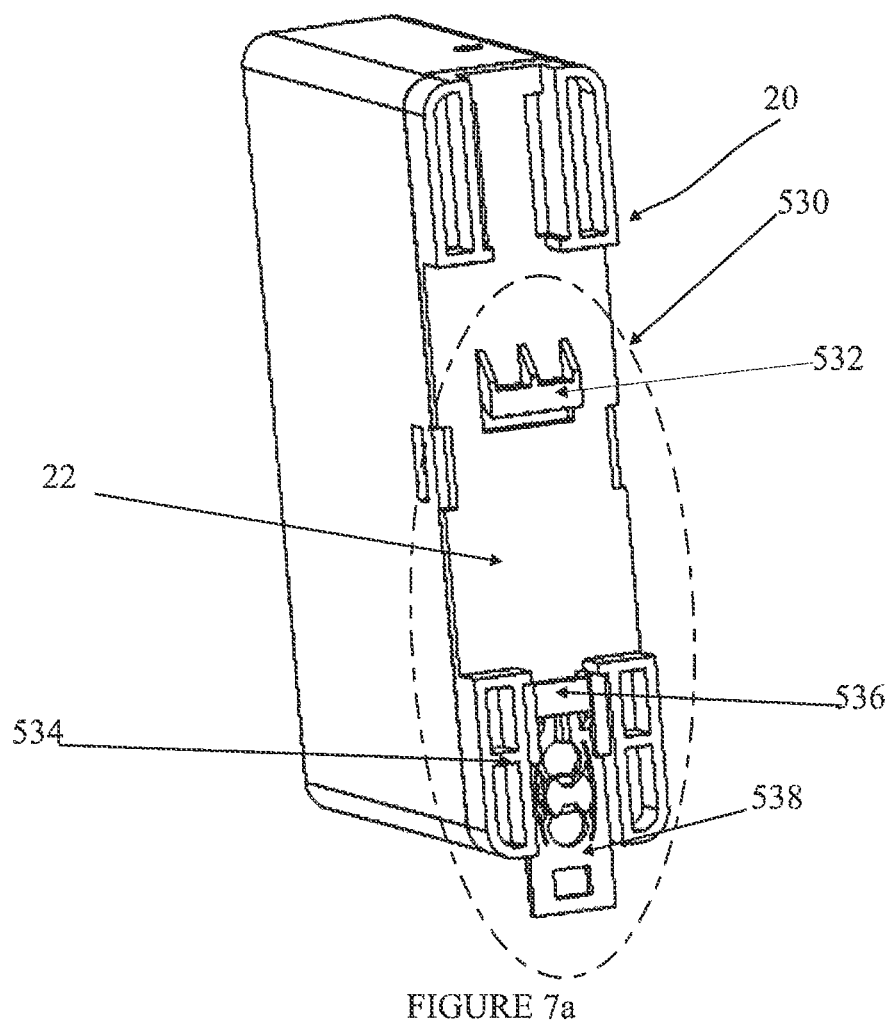
FIG. 7a illustrates a rear face of an electrical/electronic device with a latching arrangement used for detachably mounting the electrical/electronic device on the DIN rail in accordance with still another embodiment, wherein an engaging lug of the latching arrangement has urging element integrally formed therein.
Figure 7B:
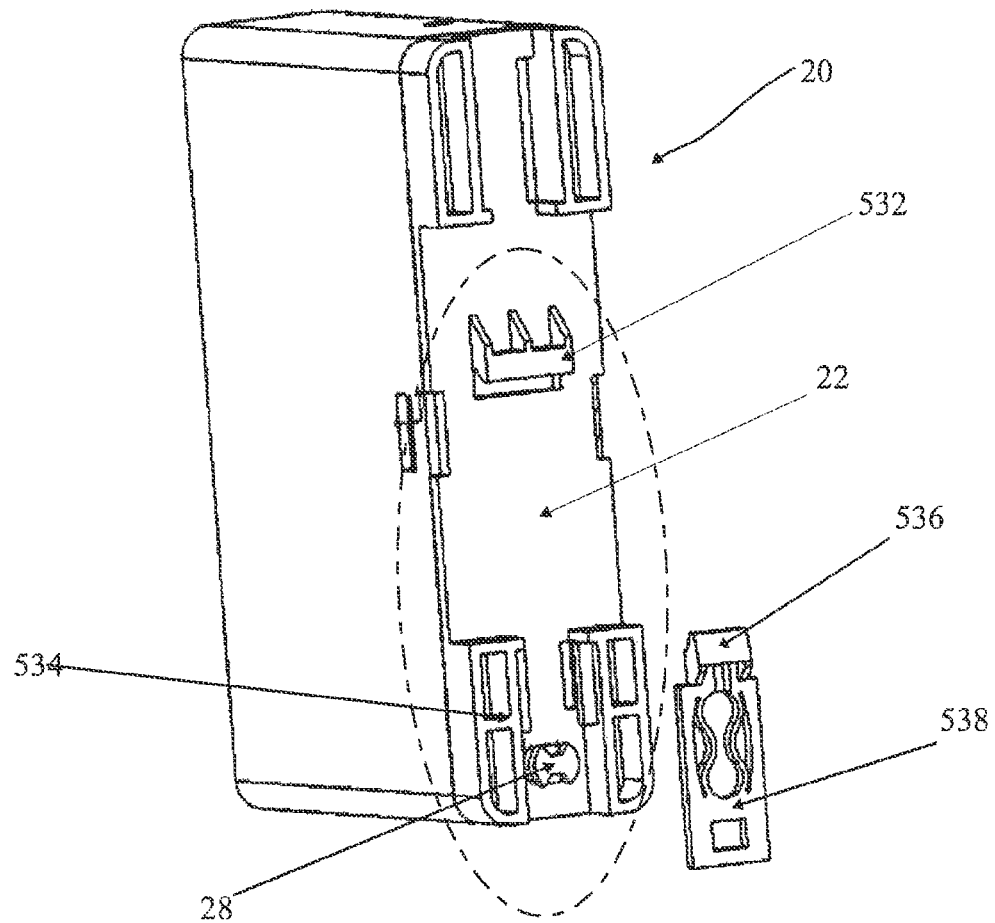
Figure 7C:
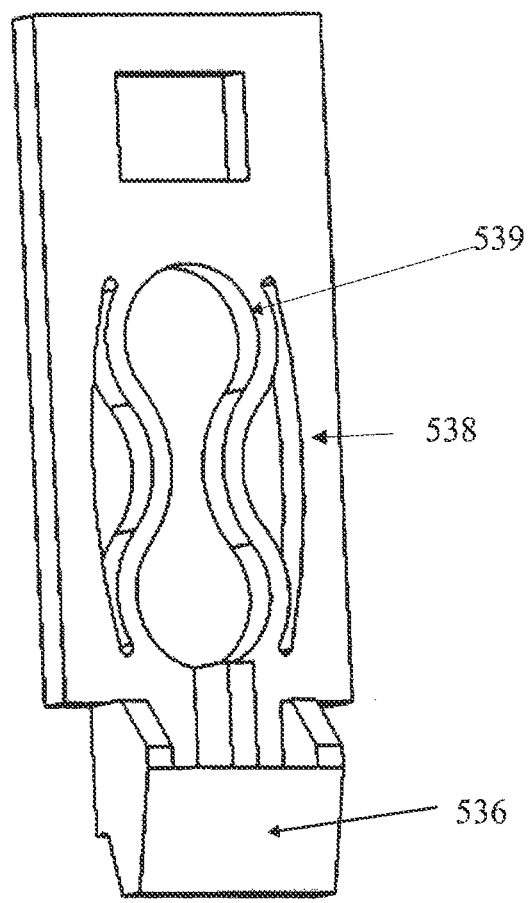
FIG. 7c illustrates an enlarged view of the engaging lug of FIG. 7b with the urging element integrally formed therein.

FIG. 7a illustrates an isometric view of a rear face of an electrical/electronic device 20 with a latching arrangement 530, a guiding slot 234, and a support member 332 used for detachably mounting the electrical/electronic device 20 on the DIN rail 10 in accordance with an embodiment, wherein an engaging lug 536 of the latching arrangement 530 has urging element 538 integrally formed therein. FIG. 7b and FIG. 7c illustrates an enlarged view of the engaging lug urging element combination of the latching arrangement 530. The urging element 538 includes a cut-out portion 539 that has a special dumbbell shaped flexible profile. Further, the rear face of the device 20 includes a rigid pad 28 configured thereon, the rigid pad 28 has a profile that facilitates mating thereof with the cut-out portion 539 having dumbbell shaped flexible profile formed on the urging element 538. Initially the urging element 538 is pressed over the pad 28 configured on the rear face of the device 20 with the cut-out portion 539 configured thereon mating with the pad 28. Once the urging element 538 gets fitted over the pad 28, the engaging lug-urging element combination is pressed in operatively upward direction, thereby causing relative movement between the cut-out portion 539 configured on the urging element 538 and the pad 28, such that the pad 28 is received in the operatively bottom slot of the cut-out portion 539 and is retained therein to define the locking configuration in which the engaging lug 536 engages with lip portion of the of the DIN rail 10 to cause the locking the electrical/electronical or electronic device 20 on the DIN rail 10. In order to disengage the engaging lug 536 an operatively downward force is applied on the on the engaging lug-urging element combination to cause relative movement between the cut-out portion 539 configured on the urging element 538 and the pad 28, such that the pad 28 is now received in the operatively top slot of the cut-out portion 539 and is retained therein to define the un-locked configuration in which the engaging lug 536 dis-engages from the lip portion of the of the DIN rail 10 to cause the release of the electrical/electronical or electronic device 20 on the DIN rail 10.

Figure 8A:
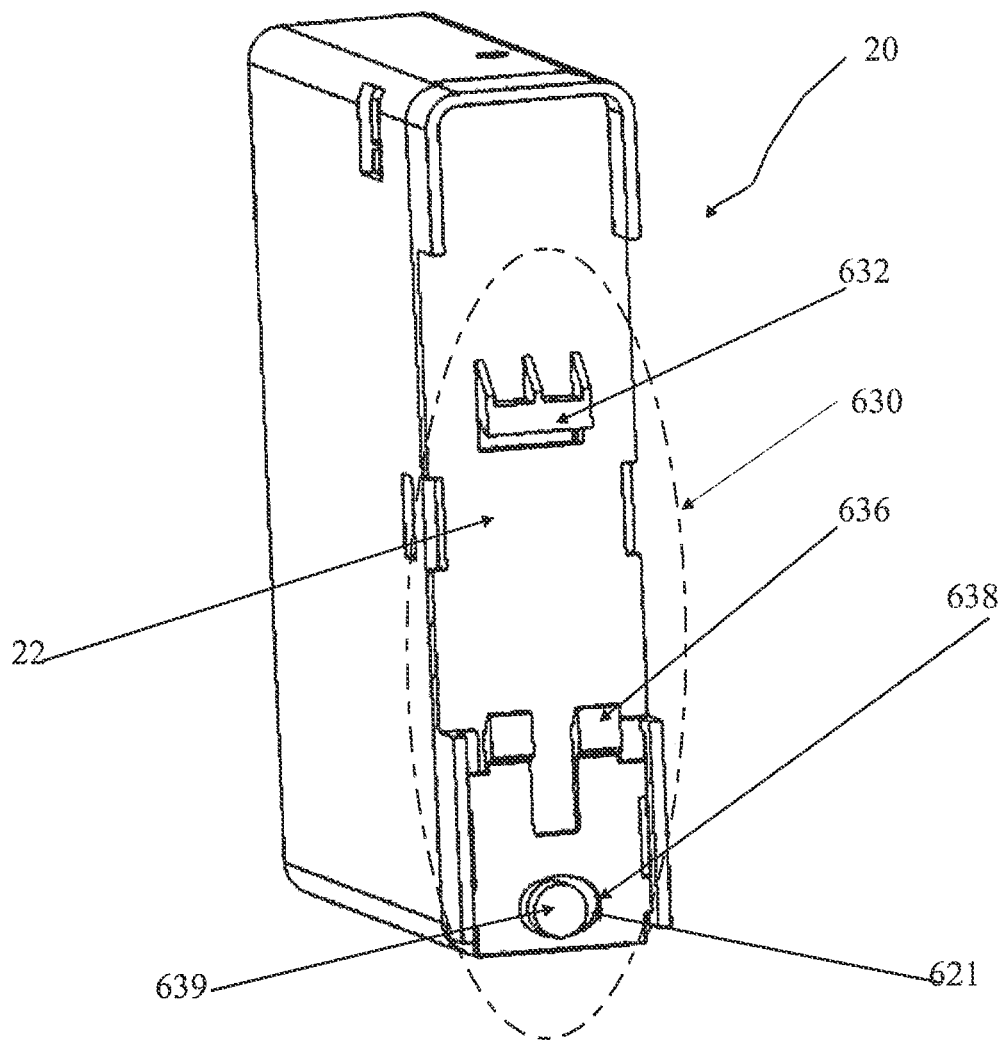
FIG. 8a illustrates a rear face of an electrical/electronic device with a latching arrangement used for detachably mounting the electrical/electronic device on the DIN rail in accordance with still another embodiment, wherein an urging element of the latching arrangement is a cam-follower arrangement.
Figure 8B:
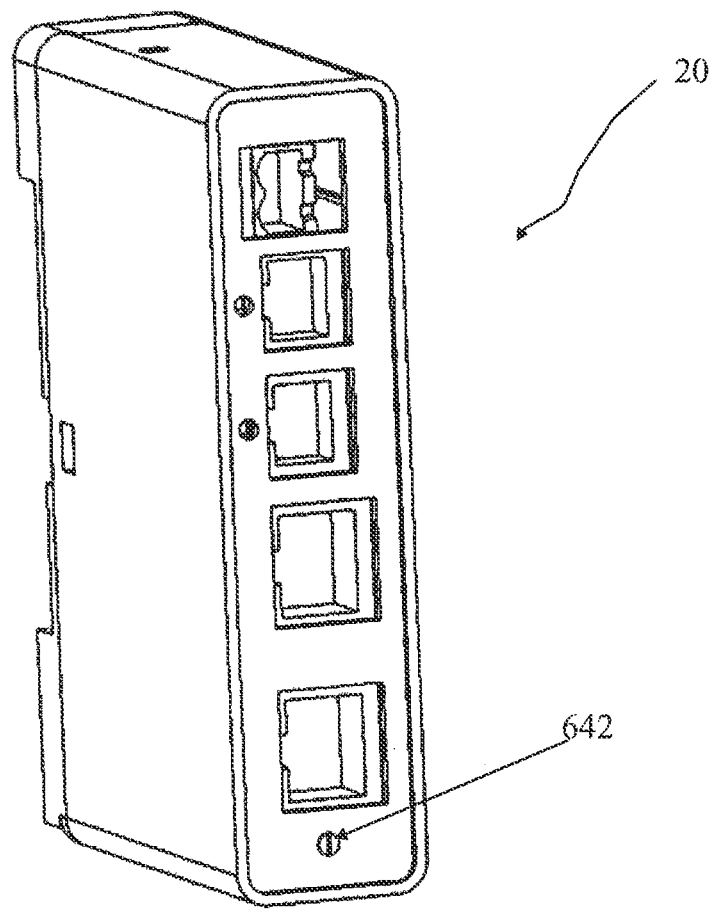
FIG. 8b illustrates a front face of the electrical/electronic device of FIG. 8a that has a provision for accessing a lever member that facilitates rotation of a cam of the cam follower arrangement.

FIG. 8a illustrates a rear face of an electrical/electronic device with a latching arrangement 630 and a support structure 632 used for detachably mounting the electrical/electronic device 20 on the DIN rail 10 in accordance with still another embodiment, wherein an urging element of the latching arrangement 630 is a cam-follower arrangement 638. The cam-follower arrangement 638, is provided with a lever member accessible from the front face of the electrical/electronic device 20 and the lever member facilitates rotation of a cam 639 of the cam follower arrangement 638 inside a slot 621 configured on the engaging lug 636, thereby causing upward and downward movement of the engaging lug 636 for respectively causing locking and unlocking of the device 20 to the DIN rail 10. In accordance with the present embodiment, there is provided a provision for applying input torque on the cam 639 with the help of the lever member 640. FIG. 8b illustrates the front face of the electrical/electronic device 20 provided with an aperture 642 for accessing the lever member 640 used for applying input torque on the cam 639.

Figure 8C:
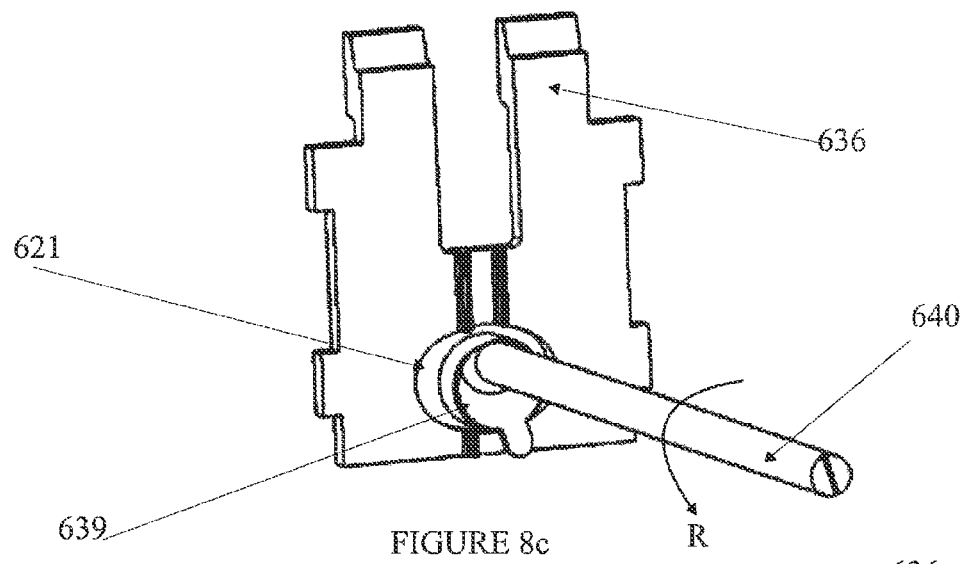
Figure 8D:
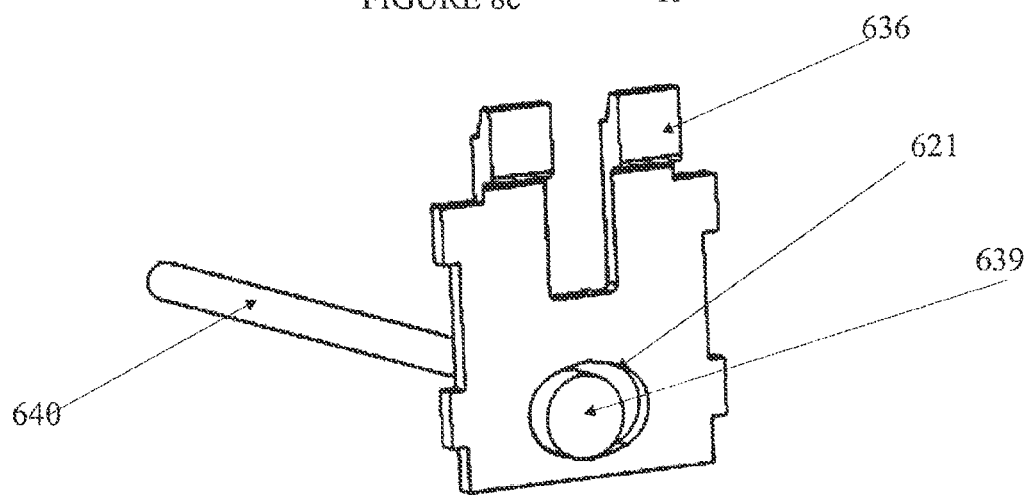

FIG. 8b, FIG. 8c and FIG. 8d illustrates the details of the cam follower arrangement 638. In the cam-follower arrangement 638, input torque can be applied with the help of lever member 640 by rotating the lever member 640 in the direction "R" as illustrated in FIG. 8c. As the lever member 640 is rotated, the engaging lug 636 moves up or down depending upon the direction of the rotation of the lever member 640, thereby resulting in the gripping or releasing of the electrical/electronic device 20 on the DIN rail 10.

Generally, the urging element is any resilient member that can be forced to take a second configuration under action of certain force and springs back to a first configuration after the force acting thereon is removed.

The latching arrangement configured on electrical/electronic devices for detachably mounting the electrical/electronic devices onto a DIN rail in accordance with the present disclosure and described herein above has several technical advantages including but not limited to the realization of:

- latching arrangement providing a reliable connection between electrical/electronic devices/DIN rail terminal blocks and a DIN rail;
- a latching arrangement configured on the electrical/electronic devices/DIN rail terminal blocks that facilitates secure mounting of the electrical/electronic devices/DIN rail terminal blocks/connector to the DIN rail, while permitting intentional removal of the DIN rail terminal blocks/connector from the DIN rail;
- a latching arrangement that prevents unintentional disengagement of the electrical/electronic devices/DIN rail terminal blocks/connector from the DIN rail;
- a latching arrangement that is simple in construction;
- a latching arrangement that requires lesser efforts for engaging and disengaging the electrical/electronic devices/DIN rail terminal blocks/connector from the DIN rail;
- a latching arrangement that is easy to manufacture;
- a latching arrangement that involves fewer number of moving parts and accordingly is less prone to failures and requires less maintenance;
- a latching arrangement that facilitates quick and easy engagement and disengagement of the electrical/electronic devices/DIN rail terminal blocks from the DIN rail;
- a latching arrangement for securely mounting the electrical/electronic devices/DIN rail terminal blocks to the DIN rail that is inexpensive;
- a latching arrangement for mounting the DIN rail terminal blocks onto the DIN rail, wherein said elements of the latching arrangement are sturdy and thereof exhibit enhanced service life; and
- a latching arrangement that can be used for all control room equipment and in applications where vibration requirements are stringent.

The numerical values given of various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A latching arrangement for detachably mounting a device on a German Institute for Standardization (DIN) rail, the latching arrangement comprising:
   a support member configured on a side of the device to be mounted on the DIN rail, said support member adapted to receive the DIN rail to facilitate aligning of the device with respect to the DIN rail;
   a guiding slot configured on the same side of the device on which said support member is configured and spaced away from said support member;
   an engaging lug received in said guiding slot and adapted to move between an extended configuration in which said engaging lug moves towards said support member and engages with a lip portion of the DIN rail received by said support member and a retracted configuration in which said engaging lug is pulled away from said support member to disengage from said lip portion of the DIN rail received by said support member; and
   an urging element cooperating with said engaging lug and the device, said urging element adapted to be configured between a first operative configuration in which said urging element urges said engagement lug towards said support member for facilitating engagement of said engagement lug with said lip portion of the DIN rail and a second operative configuration in which said urging element is moved by an applied force to facilitate moving of said engaging lug from the extended configuration, in which said engaging lug engages with a lip portion of the DIN rail received by said support member, to the retracted configuration, in which said engaging lug is pulled away from said support member to disengage from said lip portion of the DIN rail received by said support member, wherein said urging element springs back to said first operative configuration after said applied force is removed such that said urging element returns the engaging lug to the extended configuration after said applied force is removed;
   wherein said engaging lug comprises a support structure extending around a portion of said urging element to facilitate retention of said urging element within said engaging lug.

2. The latching arrangement as claimed in claim 1, wherein said urging element is a spring element adapted to be configured between a normal, non-compressed configuration in which said spring urges said engagement lug towards said support member and a compressed configuration in which said spring facilitates moving of said engaging lug away from said support member for causing disengagement of said engagement lug from said lip portion of the DIN rail.

3. The latching arrangement as claimed in claim 1, wherein said urging element is a compression spring.

4. The latching arrangement as claimed in claim 1, wherein said urging element is a helical compression spring.

5. The latching arrangement as claimed in claim 1, wherein said urging element is a leaf spring.

6. The latching arrangement as claimed in claim 1, wherein said urging element is an extension spring.

7. The latching arrangement as claimed in claim 1, wherein said engaging lug is provided with a handle adapted to facilitate pulling of said engaging lug away from said support member to disengage said engaging lug from said lip portion of the DIN rail received over said support member.

8. A latching arrangement for detachably mounting a device on a German Institute for Standardization (DIN) rail, the latching arrangement comprising:
   a support member configured on a side of the device to be mounted on the DIN rail, said support member adapted to receive the DIN rail to facilitate aligning of the device with respect to the DIN rail;
   a guiding slot configured on the same side of the device on which said support member is configured and spaced away from said support member;
   an engaging lug received in said guiding slot and adapted to move between an extended configuration in which said engaging lug moves towards said support member and engages with a lip portion of the DIN rail received by said support member and a retracted configuration in which said engaging lug is pulled away from said support member to disengage from said lip portion of the DIN rail received by said support member; and
   an urging element cooperating with said engaging lug and the device, said urging element adapted to be configured between a first operative configuration in which said urging element urges said engagement lug towards said support member for facilitating engagement of said engagement lug with said lip portion of the DIN rail and a second operative configuration in which said urging element is moved by an applied force to facilitate moving of said engaging lug from the extended configuration, in which said engaging lug engages with a lip portion of the DIN rail received by said support member, to the retracted configuration, in which said engaging lug is pulled away from said support member to disengage from said lip portion of the DIN rail received by said support member, wherein said urging element springs back to said first operative configuration after said applied force is removed such that said urging element returns the engaging lug to the extended configuration after said applied force is removed; and wherein said urging element is integrally formed with said engaging lug; and wherein said comprises a support structure extending around a portion of said urging element within said engaging lug.

* * * * *